(12) United States Patent
Sjostrand

(10) Patent No.: US 6,405,856 B2
(45) Date of Patent: Jun. 18, 2002

(54) METHOD OF LOCKING SUPPORT RAILINGS ALONG A CONVEYOR PATH

(75) Inventor: Uno Sjostrand, Flyinge (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/821,093

(22) Filed: Mar. 30, 2001

(30) Foreign Application Priority Data

Apr. 3, 2000 (SE) .............................................. 0001189

(51) Int. Cl.[7] .............................................. B65G 21/20
(52) U.S. Cl. .................................. 198/836.1; 198/836.3
(58) Field of Search .......................... 198/836.1, 836.2, 198/836.3, 836.4

(56) References Cited

U.S. PATENT DOCUMENTS

| | | | |
|---|---|---|---|
| 3,410,201 A | | 11/1968 | Swede |
| 3,788,457 A | * | 1/1974 | Valentino, Jr. ............ 198/836.1 |
| 4,932,517 A | * | 6/1990 | Johnson .................... 198/836.1 |
| 4,958,725 A | * | 9/1990 | Meade et al. ............. 198/836.1 |
| 5,803,687 A | * | 9/1998 | Ledingham ............... 198/836.3 |

FOREIGN PATENT DOCUMENTS

| | | |
|---|---|---|
| EP | 0842876 A1 | 5/1998 |
| EP | 0953523 A2 | 3/1999 |
| FR | 2285318 A1 | 4/1976 |
| WO | 9400697 A1 | 1/1994 |

* cited by examiner

*Primary Examiner*—James R. Bidwell
(74) *Attorney, Agent, or Firm*—Burns, Doane, Swecker & Mathis, L.L.P.

(57) ABSTRACT

The present invention relates to a method of fixedly locking support railings (2) along a conveyor path. The support railings (2) are of the type which has a circular cross section and are mounted in brackets (1) in one or more rows. The fixedly locking takes place by means of a tool (4) with two shanks (5) which enter into engagement with the support railing (2). A locking pin (8) is placed between the upper side (9) of the tool (4) and the bracket (1). The tool (4) is thereafter turned so that the locking pin (8) follows the periphery of the support railing (2) until the upper side of the tool (4) abuts against the bracket (1). The locking pin (8) has then reached a locking position. The method is re-usable.

5 Claims, 1 Drawing Sheet

METHOD OF LOCKING SUPPORT RAILINGS ALONG A CONVEYOR PATH

Figure 1:
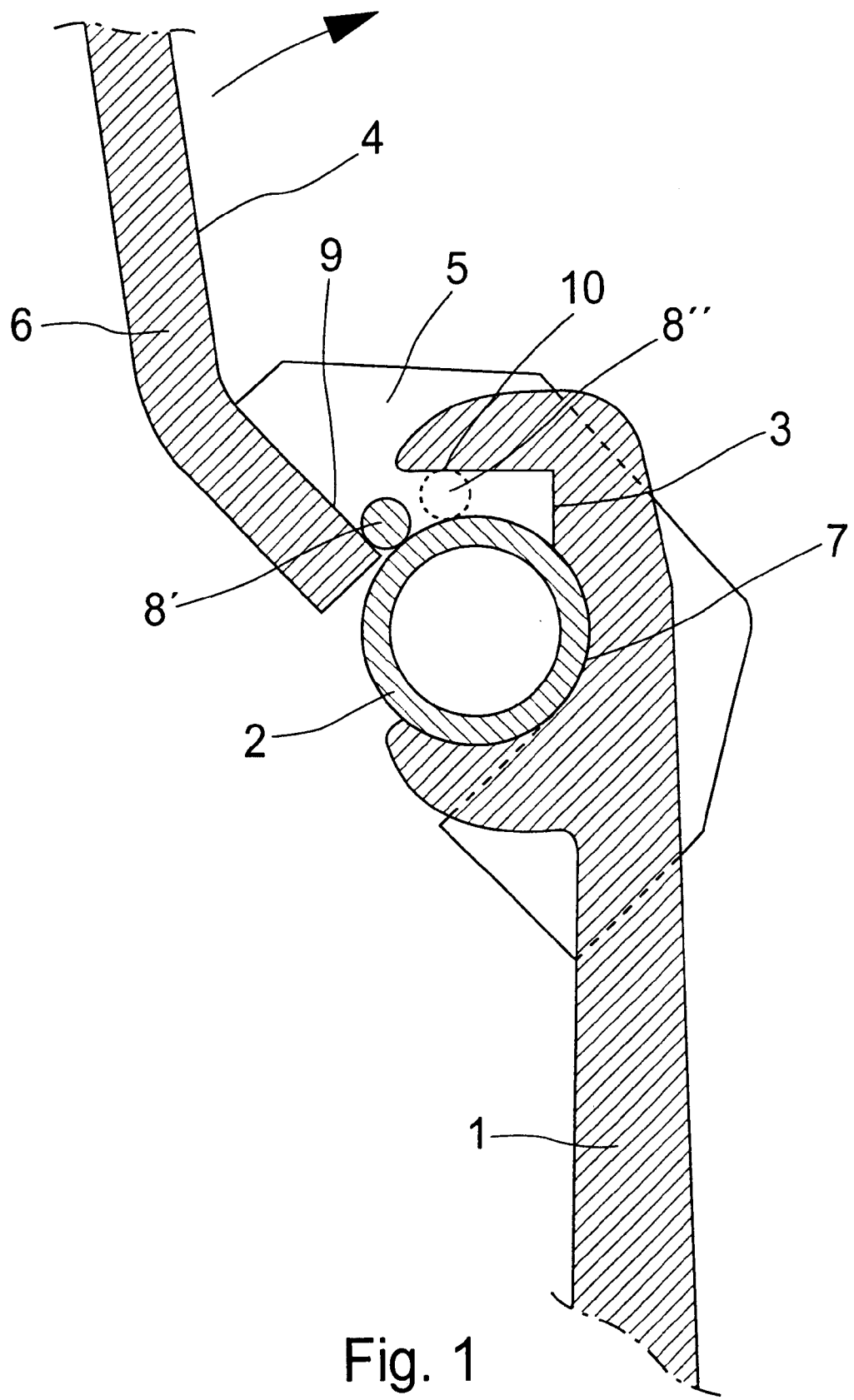

This application claims priority under 35 U.S.C. §§119 and/or 365 to Appln. No. 0001189-0 filed in Sweden on Apr. 3, 2000; the entire content of which is hereby incorporated by reference.

TECHNICAL FIELD

The present invention relates to a method of fixedly locking support railings along a conveyor path, the support railings being of the type which have a circular cross section and which, in one or more rows, are mounted in brackets.

BACKGROUND ART

Many manufacturing industries employ conveyors for conveying small or medium-sized objects or parts between production stations or from production to packing of the finished objects. Usually, the conveyors consist of driven, endless chains or belts on which the objects are advanced. Support railings often occur, disposed along the conveyor paths. The support railings are above all necessary when the objects being conveyed have a high point of gravity. The purpose of the support railings is to prevent the objects from falling off the conveyor, at the same time as the support rails must not in any way impede or risk damaging the objects.

Such conveyors also occur to a considerable extent within industries that manufacture single-use disposable packages for liquid foods. Single-use disposable packages for liquid foods are often manufactured from a packaging laminate containing paperboard with different plastic layers. For example, the single-use packages may have a parallelepipedic configuration, or alternatively they may be of the gable-top package type. A feature common to all single-use packages of this type is that they often have a high point of gravity and it is, therefore, necessary that the conveyors be provided with support railings which are properly fixedly mounted in place.

The support railings which occur most commonly today are of circular cross section, consisting of a slim tube piece. The support railings occur on both sides of the conveyor path and are disposed in one or two rows horizontally placed above each other. Each support railing is held in position by a bracket and these are normally designed for two parallel support railings. In their turn, the brackets are secured in the conveyor.

It is important that the support railing is properly fixedly secured in the bracket, and today this anchoring normally takes place with small plastic blocks which are axially slid in between the bracket and the support railing. During the fixing operation, which takes place with a tool, a piece of the plastic block is sheared off, which implies that the mounting operation must take place with the operator wearing protective goggles in order not to run the risk of being injured by flying plastic debris. However, an excessively large plastic piece is quite often sheared off, with the result that an insufficient anchorage of the support railing is obtained. Despite the fact that the plastic is specifically adapted for its purpose, it is affected by water and detergents and cracks or softens with the passage of time. Vibrations in the conveyor may result in the plastic block being laterally displaced and finally falling out of the bracket.

In particular where two parts of a support railing are joined together in a bracket, it is important that the support railings are securely in place. If a support railing comes loose, there is the risk of scratch marks on the packages which pass by the broken railing. There is also a risk that the support railing which has come loose takes hold of and tears off drinking straws or the like which are applied on the packages.

OBJECTS OF THE INVENTION

One object of the present invention is to realise a simple and reliable method of locking the support railings fixedly in place along a conveyor.

A further object of the present invention is that the locking arrangement must be able to withstand the environment in which the support railings are mounted, and that the method, after dismounting of support railings, is re-usable.

SOLUTION

These and other objects have been attained according to the present invention, in that the method of the type described by way of introduction has been given the characterising feature that the method includes a locking pin which is moved peripherally along the support railing in towards the bracket to a locking position.

Preferred embodiments of the present invention have further been given the characterising features as set forth in the appended subclaims.

BRIEF DESCRIPTION OF THE ACCOMPANYING DRAWING

One preferred embodiment of the method according to the present invention will now be described in greater detail hereinbelow, with particular reference to the accompanying Drawing, in which:

FIG. 1 shows, partly in section, how the method is reduced into practice.

The Drawing shows only those parts and details essential to an understanding of the present invention, and the placing of the bracket along a conveyor path, which is well-known to a person skilled in the art, has been omitted.

DESCRIPTION OF PREFERRED EMBODIMENT

FIG. 1 shows a part of a bracket 1 intended for a support railing 2 of circular cross section. The bracket 1 is intended to be mounted along a conveyor path (not shown). The support railing 2 in principle consists of a slim tube and comprises lengths that are joined together to form a continuous support railing 2.

The brackets 1 are placed with uniform spacing along the support railings 2 and they are always placed at that point where the support railing 2 is joined together. The brackets 1 have a certain width along which they fixedly hold the support railing 2. The width is slightly narrower along a whole section of a support railing 2 and slightly wider in the joints, so that the bracket 1 properly covers the two joined-together parts of the support railing 2.

The bracket 1 has at least one recess 3 for a support railing 2. Those brackets 1 that are employed for single-use packages today most generally have two recesses 3 placed above one another. The recess 3 is considerably larger than the cross section of the support railing 2. The remaining space in the recess 3 is employed to lock the support railing 2 fast in the recess 3.

FIG. 1 shows how the method according to the present invention is reduced into practice for locking the support railing 2 fast in the bracket 1. The support railing 2 is applied loosely in the bracket 1. A tool 4 is applied around the bracket 1 and the support railing 2. The tool 4 consists of two shanks 5 with a distance between the shanks 5 that corresponds to the width of the bracket 1. The shanks 5 are held together by means of a handle 6. The handle 6 is in the form of a slightly angled flat steel. The shanks 5 each have a recess 7 with a radius that corresponds to the radius of the support railing 2.

The tool 4 is applied so that the shanks 5 are placed on either side of the racket 1 and so that the recesses 7 of the shanks 5 enter into engagement with the support railing 2. The recesses 7 of the shanks 5 are designed so that they surround he support railing 2 for approximately half of its circumference. The tool 4 is placed at such an angle as shown in FIG. 1, so that a locking pin 8 can be placed between the planar upper side 9 of the handle 6 and the bracket 1. The locking pin 8' is shown in the Drawing in the unlocked state by solid lines.

By pulling the handle 6 in the direction of the arrow, the locking pin 8 is moved peripherally along the surface 2 of the support railing into a locking position 10 (the locking pin 8' is shown by broken lines). The movement of the handle 6 in the direction of the arrow is terminated when the planar upper side 9 abuts against the bracket 1 and the locking pin 8' is then in the locked position 10. The locked position 10 consists of a minor scooped region in the bracket 1 which is sufficient to hold the locking pin 8 in place.

The locking pin 8 is of a material that has superior properties vis-a-vis the environment, normally a dairy environment, where the support railings 2 are mounted. The material should have good flexural rigidity and is preferably manufactured from stainless spring steel. The diameter of the locking pin is adapted so that a reliable locking function will be obtained in relation to the diameter of the support railing 2 and the design of the recess 3. The brackets 1 are most generally manufactured from aluminium and the support railing 2 consists of a relatively slim tube of stainless steel. By selection of materials, there will, on the one hand, be obtained a suitable composition for the environment in which the parts are to be mounted, and, on the other hand, there will be obtained a certain flexing of the bracket 1 and support railing 2 at the instant of assembly. The support railing 2, the bracket 1 and the locking pin 8 are adapted to one another so that there will be obtained a reliable locking in place of the support railing 2.

By making the locking pin 8 somewhat wider than the bracket 1 in which the pin 8 is to be mounted, the locking pin 8 will project out a few millimetres on either side of the bracket 1. This affords the possibility of simply being able to dismount the locking pin 8. The handle 6 of the tool 4 may suitably be designed so that the other end of the tool 4 is provided with a suitable device for dismounting the locking pin 8. By the selection of material for the locking pin 8 with high flexural rigidity, the locking pin 8 may be dismounted without being bent and the locking pin 8 is thereby entirely re-usable.

As will have been apparent from the foregoing description, the present invention realises a method of locking support railings in place along a conveyor path in a simple and reliable manner. The method does not suffer from any of the problems and drawbacks of prior art solutions, and the method is also re-usable.

What is claimed is:

1. A method of fixedly locking support railings (2) along a conveyor path, the support railings (2) being of the type which have a circular cross section and which, in one or more rows, are mounted in brackets (1), characterised in that the method includes a locking pin (8) which is moved peripherally along the support railing 2 in towards the bracket (1) to a locking position (10).

2. The method as claimed in claim 1, characterised in that the fixedly locking takes place by means of a tool (4), which, during the locking, enters into engagement with the support railing (2).

3. The method as claimed in claim 2, characterised in that the tool (4) enters into engagement with the support railing (2) approximately along half of the periphery of the support railing (2).

4. The method as claimed in claim 2, characterised in that the tool (4) has two shanks (5) which enter into engagement with the support railing (2).

5. The method as claimed in claim 2, characterised in that the locking pin (8) is placed between the upper side (9) of the tool (4) and the bracket (1); and that the tool (4) is rotated so that the locking pin (8) follows the periphery of the support railing (2) until the upper side (9) of the tool (4) abuts against the bracket (1).

* * * * *